March 5, 1963  P. F. GIESKING  3,080,075
AUTOMATIC CAR DUMPING APPARATUS
Filed Jan. 26, 1960  8 Sheets-Sheet 1

INVENTOR
Paul Frederick Giesking

Pierce, Scheffler & Parker
ATTORNEYS

March 5, 1963 P. F. GIESKING 3,080,075
AUTOMATIC CAR DUMPING APPARATUS
Filed Jan. 26, 1960 8 Sheets-Sheet 2

INVENTOR
Paul Frederick Giesking

BY Peirce, Scheffler & Parker
ATTORNEYS

March 5, 1963 P. F. GIESKING 3,080,075
AUTOMATIC CAR DUMPING APPARATUS
Filed Jan. 26, 1960 8 Sheets-Sheet 4

INVENTOR
Paul Frederick Giesking

BY Pierce, Scheffler & Parker
ATTORNEYS

March 5, 1963 P. F. GIESKING 3,080,075
AUTOMATIC CAR DUMPING APPARATUS
Filed Jan. 26, 1960 8 Sheets-Sheet 5

INVENTOR
Paul Frederick Giesking
BY Pierce, Scheffler & Parker
ATTORNEYS.

March 5, 1963 P. F. GIESKING 3,080,075
AUTOMATIC CAR DUMPING APPARATUS
Filed Jan. 26, 1960 8 Sheets-Sheet 6

INVENTOR
Paul Frederick Giesking

BY Peirce, Scheffler & Parker
ATTORNEYS

March 5, 1963  P. F. GIESKING  3,080,075
AUTOMATIC CAR DUMPING APPARATUS
Filed Jan. 26, 1960  8 Sheets-Sheet 7

Fig. 15.

INVENTOR
Paul Frederick Giesking

BY Peirce, Scheffler & Parker
ATTORNEYS

March 5, 1963 P. F. GIESKING 3,080,075
AUTOMATIC CAR DUMPING APPARATUS
Filed Jan. 26, 1960 8 Sheets-Sheet 8

INVENTOR
Paul F. Giesking

BY Pierce, Scheffler & Parker
ATTORNEYS 3,080,075
AUTOMATIC CAR DUMPING APPARATUS
Paul Frederick Giesking, Hoyt Lakes, Minn., assignor to Erie Mining Company, Hibbing, Minn., a corporation of Minnesota
Filed Jan. 26, 1960. Ser. No. 4,816
11 Claims. (Cl. 214—63)

This invention relates generally to an automatic ore car dumping apparatus, and more particularly to an automatic car dump system wherein the doors of the ore cars of a train are automatically and selectively operable by remote controlled actuating means as the cars pass over given delivery areas.

This application is a continuation-in-part application of my earlier filed, but now abandoned parent application Serial Number 839,132 filed September 10, 1959 and entitled, "Automatic Car Dumping Apparatus."

It is well known in the prior art to provide various means for automatically opening and closing the discharge doors of an ore car as the car passes over a given delivery area. These known devices, however, contain certain inherent structural and functional drawbacks. For example, the known devices have not lent themselves for remote control operation by durable, inexpensive means, and the known types of apparatus are not suitable for selective operation wherein the contents of various ore cars of the train are to be deposited into different delivery areas as the train passes slowly over the delivery areas.

The present invention is directed to an improved system for automatically and selectively operating the discharge doors of a plurality of ore cars travelling in a train on bed rails over given delivery areas.

The primary object of my invention is to provide an automatic car dumping apparatus wherein the movement of an ore car relative to a stationary door operating rail is transmitted to door operating gearing means by a resilient wheel rotatably secured to said car and adapted to frictionally engage said door operating rail.

Another object of my invention is to provide means for automatically opening and closing the doors of a train of ore cars as the cars pass on bed rails over a given delivery area, said means including a sectional door-opening rail on one side of the bed rails and a parallel sectional door-closing rail on the other side of the bed rails adjacent said delivery area, the sections of each of said rails being pivotally connected at their adjacent ends and vertically movable by means of independently operable lifting jacks positioned beneath each hinge connection.

A further object of my invention is to provide a remote-controlled automatic ore car dumping system for selectively discharging ore from various cars of a train into preselected delivery areas and for selectively discharging ore from other cars of the train into other delivery areas, said system including vertically-displaceable door-opening and door-closing rails having a plurality of independently-operable hingedly-connected sections.

A more specific object of my invention is to provide remote control panel means for independently operating the lifting jacks positioned beneath the hinge joints of a sectional door operating rail, said control panel means having means associated therewith for successively operating switches which independently control the movement of the sections of the door operating rail as a train of ore car passes over a plurality of delivery areas.

A further object of my invention is to provide a novel electro-pneumatic jack structure for vertically adjusting the hinge joint at the ends to two pivotally connected horizontal door-operating rail sections.

Other objects and advantages of the present invention will become more apparent from a study of the following specification when considered in conjunction with the accompanying drawings, in which.

Figure 1:
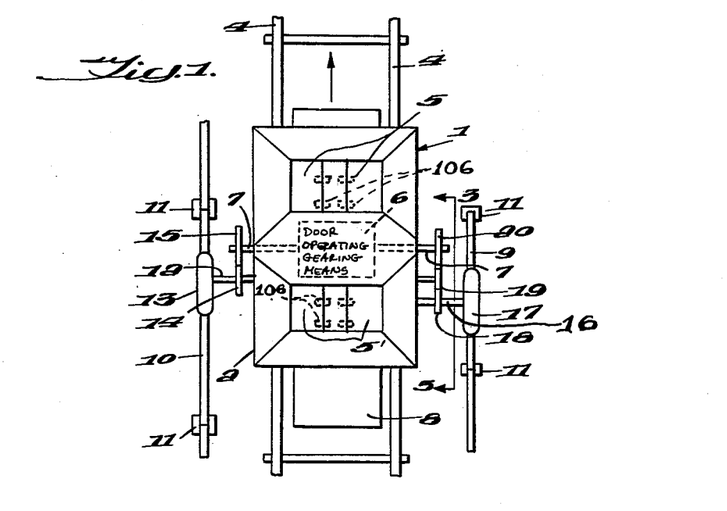
FIG. 1 is a plan view of the ore car positioned on the bed rails over one of a plurality of delivery areas.
Figure 2:
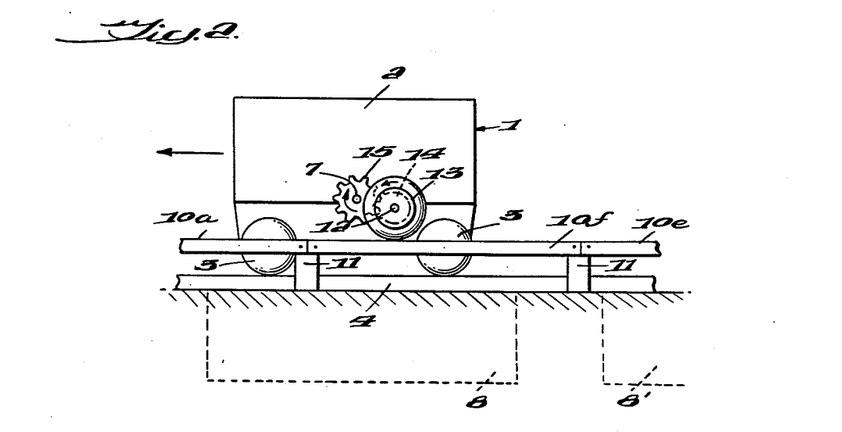
FIG. 2 is a side elevational view of the ore car of FIG. 1.
Figure 3:
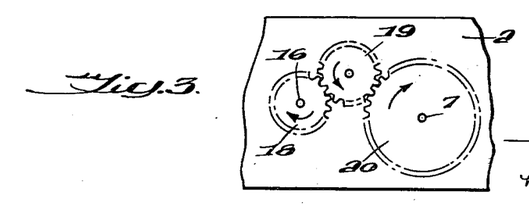
FIG. 3 is a detail view taken along line 3—3 of FIG. 1 illustrating the gearing connection of the door opening shaft to the door operating gearing means.

Referring first more particularly to FIGS. 1–3, the ore transporting car shown generally by the reference numeral 1 consists of a car body 2 having wheels 3 by means of which the car body is transported over the bed rails 4. In a manner well known in the ore car dumping art, the car body 2 has two pairs of pivotally mounted doors 5, 5' in the bottom thereof which are operable to a closed position or to an open ore discharging position by means of well-known door operating gearing means 6. The door operating gearing means has a rotary shaft 7 extending laterally from the car body 2 and the gearing may be of the worm gear type, the rack and pinion type, or other suitable type.

A plurality of cars 1 loaded with ore are transported on the bed rails 4 over the "delivery areas" 8 and 8' located below the bed rails. These "delivery areas" may be storage bins, delivery chutes, boat loading means, or the like.

The present invention is directed to means for automatically driving the door operating gearing means 6 as the train engine draws the ore cars at a low rate of speed (on the order of five miles per hour) over a selected delivery area. According to the invention a door opening rail 9 is positioned parallel to the bed rails 4 on one side thereof adjacent a given delivery area. On the other side of the bed rails 4 and parallel thereto is positioned a door closing rail 10. As will be described in greater detail below, each of the rails (9, 10) consists of a plurality of hingedly-connected rail sections. Referring to FIG. 2 it will be seen that the door closing rail consists of a plurality of hingedly-connected sections (10a, 10f and 10e). The car door operating rails (i.e. channels having abrasive surfaces) are supported at a level higher than the bed rails 4 and are vertically movable relative thereto by means of the electro-pneumatic jacks 11 which are independently operable in a direct or remote controlled manner as will be explained in greater detail below.

Extending laterally from one side of the car body 2 and rotatably connected thereto is the shaft 12 having a resilient wheel 13 rigidly secured thereto. The wheel 13 is arranged to come into frictional engagement with the door closing rail 10 when the rail is raised to the proper height as will be explained below. As shown in FIGS. 1 and 2, the shaft 12 is directly geared to the door operating gearing means shaft 7 by means of the gears 14 and 15, although it is contemplated that the connection could also include clutch means of the manually or electrically controlled type if desired. As shown in FIG. 2, when the ore car 1 travels in the direction indicated by the arrow and the rail 10 is at the proper height, the rotation of the wheel 13 in the counterclockwise direction by frictional engagement with the rail 10 will cause shaft 7 to be driven in the clockwise direction due to the meshing of gears 14 and 15; consequently the door operating gearing means will be driven in a direction to cause closing of the car doors 5, 5'.

Extending laterally from the other side of the ore car 2 and rotatably connected thereto is the shaft 16 having resilient wheel 17 rigidly secured thereto and arranged to come into frictional engagement with the door opening rail 9. The resilient wheels 13 and 17 are preferably of the pneumatic tire type commonly used on automotive vehicles as will be explained below, although it is possible that other types of wheels would work equally as well. The wheel shaft 16 is geared to the shaft 7 of the door operating gearing means by means of the gear train 18, 19 and 20. Due to the presence of the intermediate or reversing pinion 19, the shaft 7 will be rotated in a direction opposite to that of FIG. 2 to drive the door operating gearing means to cause opening of the car doors 5, 5' when the door opening rail 9 is at a height to frictionally engage the resilient wheel 17. Of course it should be mentioned that means are provided in the remote master controller to prevent both rails 9 and 10 from being at heights to engage resilient wheels 13 and 17 at the same time. While the door operating rails 9 and 10 have been illustrated as being on opposite sides of the bed rails 4, it is obvious that the apparatus could be readily modified for operation with the rails 9 and 10 on the same side of the bed rails.

Figure 17:
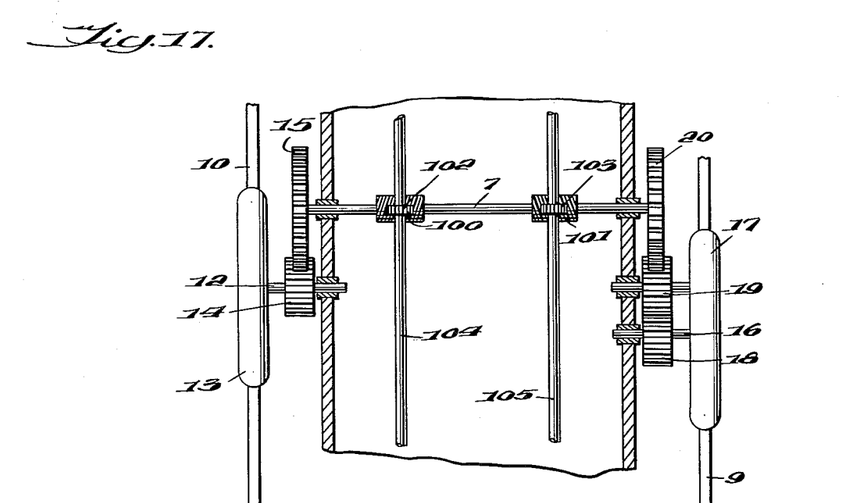
FIG. 17 is a detailed view of the door operating gearing means illustrated diagrammatically by a block diagram of FIG. 1.

Referring now more particularly to FIG. 17, the rotary shaft 7 has worm gears 100, 101 rigidly mounted thereon, which worm gears are in mesh with pinions or worm reduction gears 102, 103, respectively. Pinion 102 is rigidly secured to the door actuating rod 104 and pinion 103 is rigidly secured to door actuating rod 105. The teeth of worm gears 102, 103 are of opposite pitch so that rotation of shaft 7 in one direction will cause clockwise rotation of rod 104 and counter-clockwise rotation of rod 105, and rotation of shaft 7 in the opposite direction will cause counter-clockwise rotation of rod 104 and clockwise rotation of rod 105.

Figure 18:
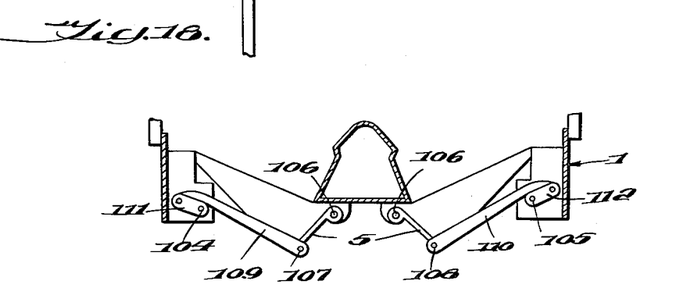
FIG. 18 is a detailed transverse vertical section illustrating the door operating linkage means.

It has been assumed, for sake of illustration, that the ore transporting car 1 is of the type having a car body resiliently supported by truck springs (not shown) relative to a railway car truck and having four normally inclined-when-closed dump doors that are each pivotally carried at their upper ends on a plurality of hinge pins 106 supported by the under frame of the car body and running parallel to the bed rails. As shown in FIG. 18, the car doors 5, 5 are arranged crosswise of the car from each other and are so carried on the hinge pins that they will swing in opposite directions (namely, inwardly, toward each other) when moving to their respective fully open positions in which the doors hang vertically, and will swing away from each other when moving to their respective closed positions in which they are so inclined as to define therebetween an obtuse included angle.

The unhinged lower ends of the doors 5, 5 are pivotally connected by pins 107, 108 to respective one ends of levers 109, 110, which at their respective opposite ends are pivotally connected to toggle links 111, 112, which in turn, are connected to the door actuating rods 104, 105, respectively. These actuating rods are mounted for rotation in fixed journal bearings, not shown, secured to the ore car body.

It is readily apparent that rotation of shaft 7 in the door opening direction by contact of wheel 17 with rail 9 will cause rotation of actuating rods 104 and 105 in opposite directions to pivotally actuate the toggle links 111, 112 to cause opening of both car door pairs 5, 5', and rotation of shaft 7 in the door closing direction by contact of wheel 13 with rail 10 will cause reversal of rotation of the actuating rods 104 and 105 in opposite directions to pivotally close the car door pairs.

Figure 4:
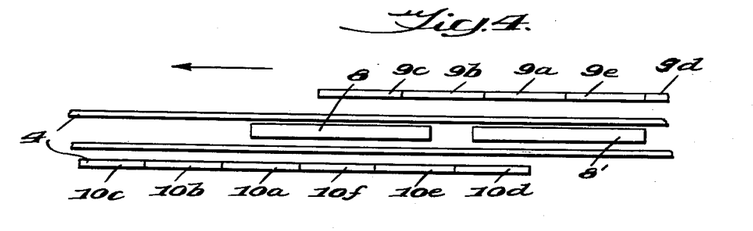
FIG. 4 is a plan view of the selective dumping arrangement.
Figure 5:
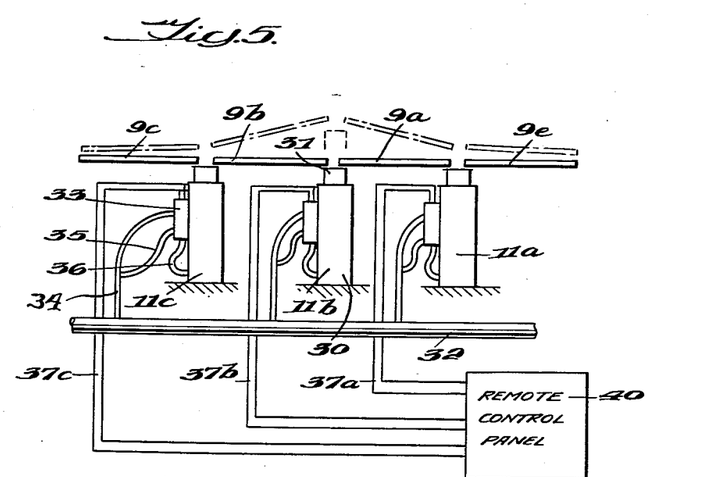
FIG. 5 is a diagrammatic representation of the means for vertically displacing one hinge connection of the door operating rails.

Referring now to FIGS. 4 and 5, the location and actuation of the door opening and door closing rails will be described. Assuming first that it should be desired to deposit ore into delivery area 8, the hingedly-connected sections 9a, 9b and 9c of the door opening rail 9 are caused to be elevated by the actuation of the proper associated electro-pneumatic jacks 11 so that the sections will engage the resilient wheel 17 to develop a torque force thereon to rotate shaft 7 in the desired direction. The ore will be deposited by gravity from the ore cars through the open doors into the delivery area 8 as the train of ore cars passes slowly and continuously along the bed rails 4.

Similarly by raising the rail sections 10a, 10b, and 10c by actuating of the proper jacks 11, the rail sections will frictionally engage resilient wheel 13 to develop a torque force thereon to cause rotation of shaft 7 in the direction to cause closing of the car doors 5, 5' as the train of cars continues its slow movement along the bed rails. Thus it is apparent that the movement of the ore cars themselves provides the necessary power for operating the door operating gearing means 6, and consequently the provision of expensive individual motor means on each of the ore cars is not required.

For selective delivery of ore into the delivery area 8', in a similar manner the car doors 5, 5' may be caused to be opened by proper actuation of the door opening rail sections 9d and 9e and to be closed by proper actuation of the door closing rail sections 10d, 10e and 10f. It is to be remembered that FIG. 4 is merely a diagrammatic illustration of the operation of the invention and that in actual practice the length and number of delivery areas (storage bins) could be varied greatly as desired, as well as the number and lengths of the door operating rail sections.

Referring to FIG. 5, an electro-pneumatic jack 11 is positioned beneath each hinge joint at the ends of adjacent rail sections. Each jack consists of a stationary outer sleeve member 30 and a vertically movable inner sleeve member 31. Air (or any other suitable fluid) is fed under pressure to the jacks 11a, 11b, 11c by means of the common air pressure header 32. As will be explained below, each jack has an electrically-controlled valve 33 which controls the feeding of the pressure fluid to the jack through the flexible conduits 34, 35 and 36. The electrically controlled valves each have individual electrical circuits 37a, 37b, 37c leading to the remote control panel 40 so that the various jacks may be independently operated by one operator at a master control station. Assuming, for example, that the circuit 37b of FIG. 5 were to be actuated independently of the other circuits, the solenoid valve 33b would be energized to introduce pressure fluid to the jack 11b to cause the inner sleeve 31b to be raised vertically relative to the outer sleeve 30b to the position shown in the phantom lines in FIG. 5, resulting in movement of the hingedly connected rail sections 9a and 9b to the positions shown by the phantom lines. The rail sections are normally biased downwardly by their weight to a position which cannot be engaged by the rotatable wheels 17 or 13.

Figure 6:
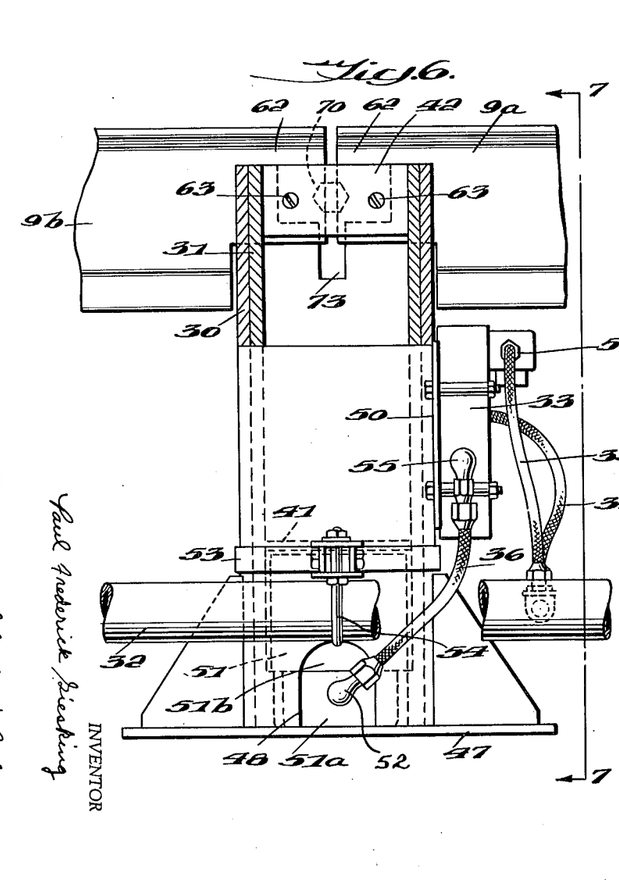
FIG. 6 is a detailed sectional view of the electro-pneumatic jack taken along line 6—6 of FIG. 7.
Figure 7:
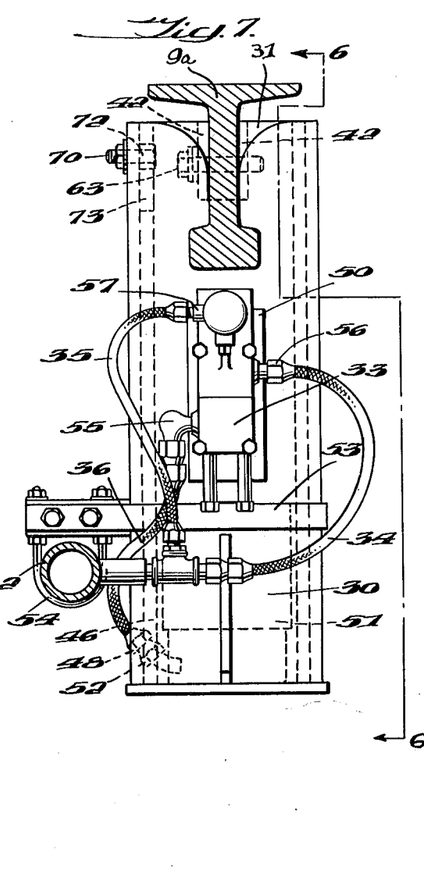
FIG. 7 is a sectional view taken along line 7—7 of FIG. 6.
Figure 8:
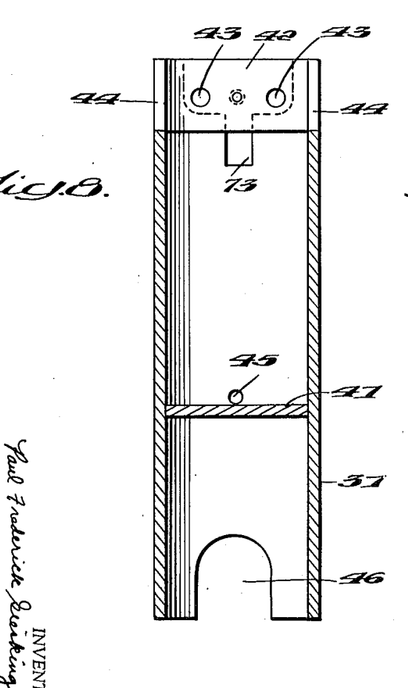
FIG. 8 is a sectional view of the inner sleeve member of the jack taken along line 8—8 of FIG. 9.
Figure 9:
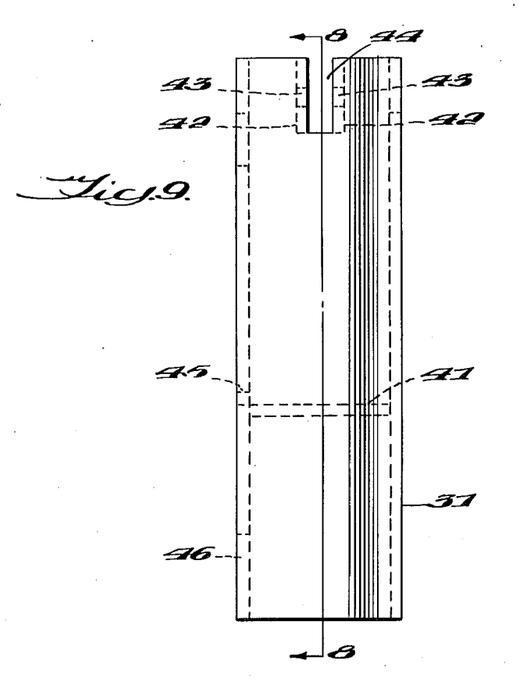
FIG. 9 is an elevational view of the inner sleeve member of the jack.

Referring now to FIGS. 6–11, the jack consists of an outer tubular sleeve 30 (shown in detail in FIGS. 10 and 11) and an inner tubular sleeve 31 (shown in detail in FIGS. 8 and 9).

As shown in FIG. 8, the inner tubular sleeve 31 has a transverse circular divider plate 41 rigidly connected intermediate its ends to the inner periphery thereof (by welding or the like). Within the upper end of the inner tubular sleeve are rigidly secured a pair of spaced vertical hinge plates 42 having apertures 43 therein. Diametrically opposed slots 44 are provided intermediate the plates in the wall of the inner sleeve and a drain hole 45 is provided adjacent the upper surface of the divider plate 41. A slot 46 is arranged at the lower end of the inner sleeve.

Figure 10:
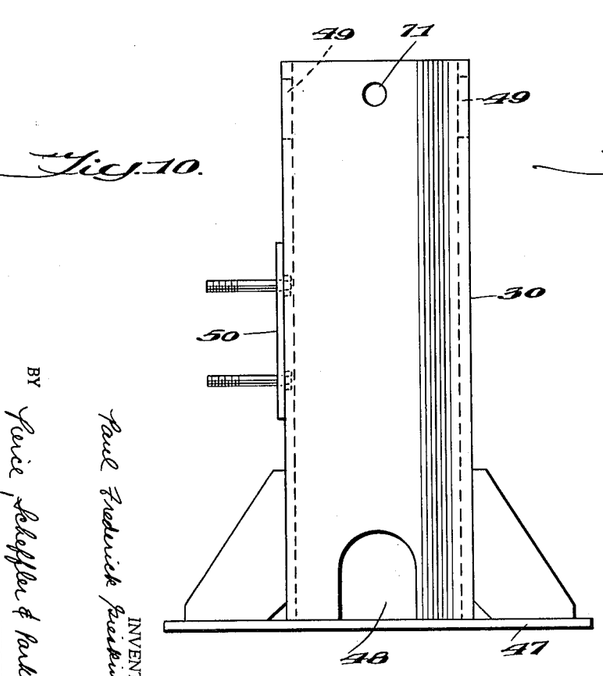
FIG. 10 is a side elevational view of the outer sleeve member of the jack and FIG. 11 is a side elevational view taken at 90° to the view of FIG. 10.
Figure 11:
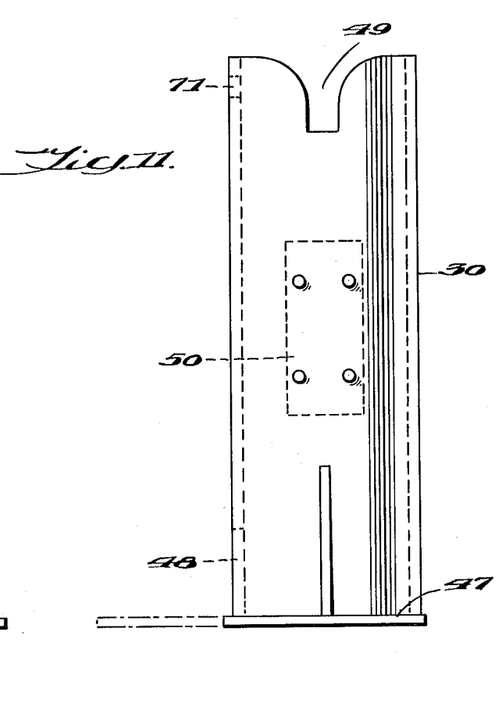

As shown in FIGS. 10 and 11, the outer sleeve 30 is secured at its lower end to a base plate 47 and is provided with a slot 48 adapted to be arranged opposite the slot 46 of the inner sleeve. At its upper extremity the outer sleeve has two diametrically arranged slots 49 adapted to be positioned opposite slots 44 in the inner sleeve. Secured to the outer periphery of the outer sleeve is the plate 50 by means of which the electrically operated valve 33 may be structurally secured to the jack.

Referring now to FIGS. 6 and 7, the vertically-arranged pneumatic cylinder 51 is inserted in the bottom of the outer sleeve 30 and spaced from the inner periphery thereof. The inner sleve 31 is then slidably inserted downwardly within the outer sleeve 30 as shown in FIG. 6 with the pneumatic cylinder 51 mounted concentrically within the lower portion of the inner sleeve below the transverse partition 41. The air pressure fitting 52 of the pneumatic cylinder extends through the slots 46 and 48 in the inner and outer sleeves, respectively, as shown in FIG. 7. The air pressure header 32 is clamped to the outer sleeve by means of the clamping ring 53 and the U-shaped clamp 54.

The output fitting 55 of the electrically controlled valve is connected to cylinder fitting 52 by means of flexible conduit 36, and the inlet fittings 56 and 57 of the electrically controlled valve are connected to the air pressure header tap-off connection by the conduits 34 and 35, respectively.

Figure 12:
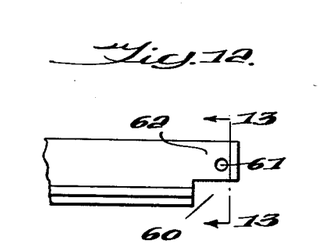
FIG. 12 is a detailed view of one end of a door operating rail and FIG. 13 is a sectional view taken along line 13—13 of FIG. 12.
Figure 13:
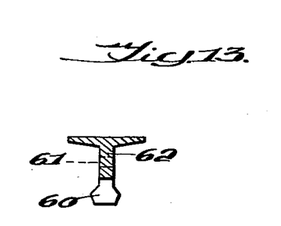

As shown in FIGS. 6, 12 and 13, each rail section has at each end a cut-away or notched recess 60 at the lower extremity thereof. An aperture 61 extends through the rail above the notched recess 60. As shown by the configurational outline of FIG. 13, the rail is a standard railroad rail which has been arranged with the flanged portion uppermost.

In order to hingedly connect the rails to each other and to the inner sleeve 31, the end portions 62 of the door operating rails above the notched recesses are inserted through the slots 49 and 44 of the outer and inner sleeves and between the spaced plates 43 which are rigidly secured to the inner sleeve. Bolts 63 are then inserted through the apertures 43 in the plates 43 and the apertures 61 in the ends of the rails to pivotally connect the ends of the rails to the inner sleeve 31.

In order to displace the inner sleeve 31 vertically relative to the outer sleeve 30 as shown in FIG. 5, the electric circuit to the solenoid valve 33 is closed and air under pressure is fed to the pneumatic cylinder 51 through conduit 36. The piston element 51a will then be displaced longitudinally relative to the cylinder element 51b thus tending to move plate 41 upwardly relative to the base plate 47 and consequently cylinder 31 and hinge plates 42 will also be moved upwardly relative to the base plate 47. The rail sections 9a and 9b will be displaced as shown in FIG. 5.

In order to limit the upward extent of movement of the inner sleeve 31 relative to the outer sleeve 30 a stop bolt 70 is mounted in an aperture 71 in the outer sleeve. The head 72 of bolt 70 extends within the vertical slot 73 in the inner sleeve 30 and the upper extent of travel of the inner sleeve 31 is limited by the cooperation of the bolt head 72 with the bottom of the slot 73.

Figure 14:
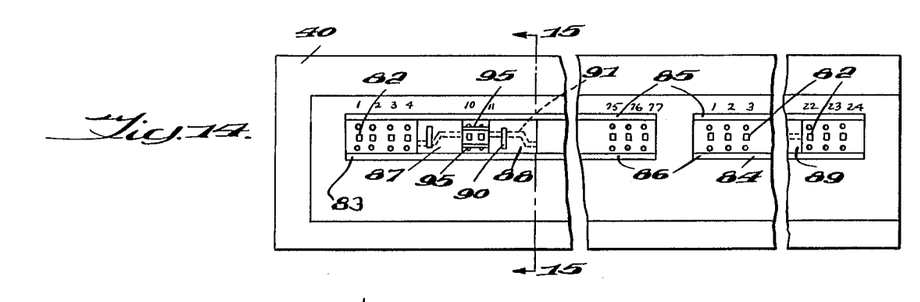
FIG. 14 is a front elevational view of the remote control panel with the doors removed.
Figure 15:
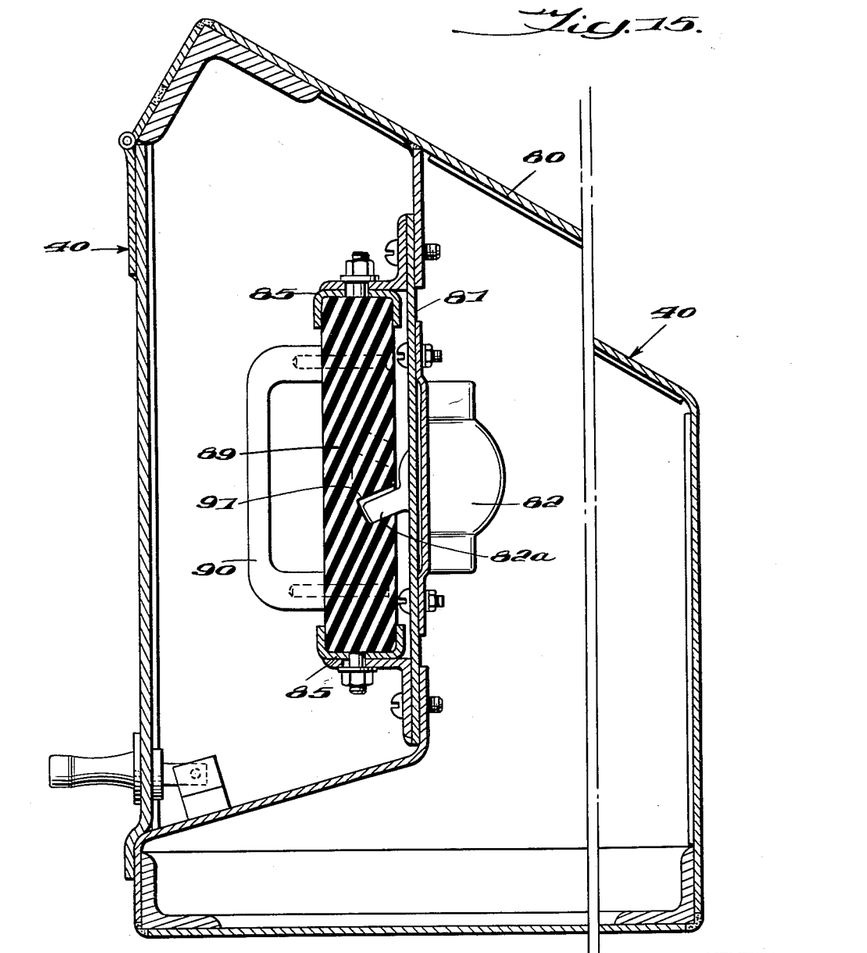
FIG. 15 is a sectional view taken along line 15—15 of FIG. 14.

Referring now to FIGS. 14 and 15, the remote control panel 40 consists of a sheet metal housing 80 in which is mounted a supporting plate 81 to which are secured the mercury switches 82. As stated above, a separate mercury switch 82 and associated circuit 37 is provided for each solenoid valve 33 so that each electro-pneumatic jack may be independently actuated from the remote control panel. The switches are arranged in two groups on the panel—group 83 for the jacks of the door opening rail 9 and group 84 for the door closing rail 10. In the embodiment illustrated in FIG. 14, there are seventy-seven switches (and thus seventy-seven jacks) associated with the sectional door-opening rail, and twenty-four switches (and twenty-four jacks) associated with the sectional door closing rail.

While the switches 82 may be individually operated manually by an operator at the remote control panel 40, according to the present invention means are provided for manually operating a plurality of switches sequentially in a desired manner. As shown in FIGS. 14 and 15, parallel spaced U-shaped guide bars 85, 86 are secured to the supporting plate 81 above and below the switches, respectively. Slidably mounted between the guide rails 85, 86 are rectangular Micarta blocks 87, 88 and 89. The Micarta blocks are provided on their forward faces with the operating handle means 90, and in their rear faces are provided cam tracks 91. The cam tracks 91 are adapted to receive the switch actuating members 82a as shown in FIG. 15.

As shown in FIG. 14, the cam tracks in the rear faces of the Micarta blocks are so arranged as to vertically pivot the switch actuating members 82a to their open or closed positions as the blocks are slidably displaced along the guide bars 85, 86. The lengths of the Micarta blocks are such that a number of switch actuating members will be present in the guide track of a single Micarta block at any given time. As shown in FIG. 14, the Micarta blocks 87 and 88 may be connected by longitudinally adjustable spacing elements 95 so that the two blocks will slide as a unit between the guide bars; thus it is possible to switch on ten or so successive switches as the guide blocks 87 and 88 are displaced across the control panel in accordance with the travel of the train of ore cars over the bed rails. If desired, the movement of the guide blocks may be mechanically related to the movement of the train by suitable means, not shown. It is also possible to correlate the movement of the guide blocks 87, 88 controlling the door opening rail with the movement of the guide block 89 controlling the door closing rail. Thus actuation of a section of the door closing rail (10e for example in FIG. 4) may be prevented when the opposite door opening rail section (9b) is actuated.

Figure 16:
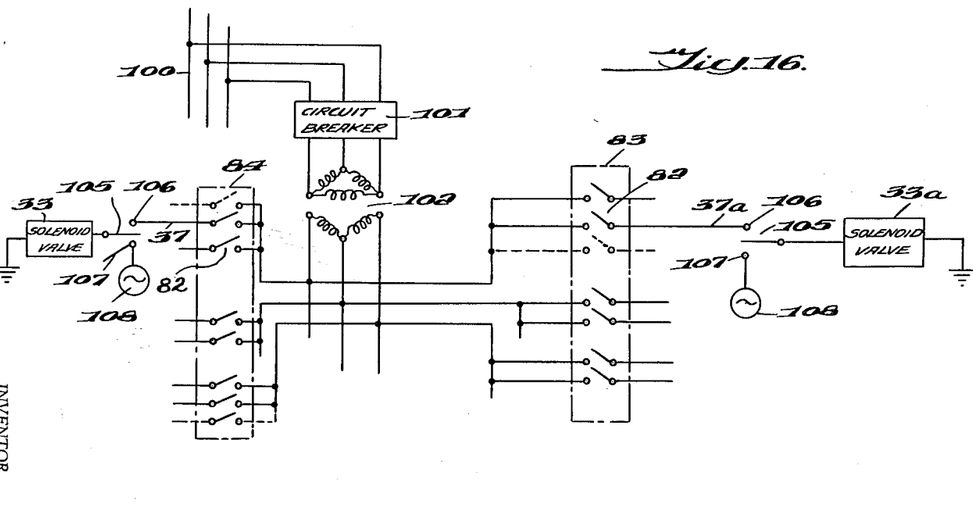
FIG. 16 is a schematic diagram of the electrical circuit by means of which electric power is independently transmitted to the individual electro-pneumatic jacks.

The electrical circuit of the system is schematically illustrated in FIG. 16. The three-phase power is fed from the supply mains 100 through the circuit breaker 101 and the transformer means 102. Power is fed on one hand to the mercury switch group 83 controlling movement of the door opening rail sections and on the other hand to the mercury switch group 84 controlling the movement of the door closing rail sections. Each switch 82 of the switch group is connected to the associated solenoid valve 33 through a three-position switch 105 secured to the outer sleeve 30 of the associated jack. The switches 105 have been illustrated as being in the "Off" position, although the movable contacts of switches 105 normally engage stationary contacts 106 in the circuits 37. Should the operation of any particular pneumatic jack be desired to be tested by a workman walking beside the bed rails 4, the workman may manually displace the movable contact of a given switch 105 into engagement with the stationary "test" contact 107 which is connected to a separate source of A.-C. power 108 (or to the means 100 by a separate circuit). The associated jack 11 will then be operated independently of the master control panel 40. Should it be desired for some reason to disconnect a given jack from operation by the master control panel, the associated switch 105 is merely set manually to the "Off" position.

In a prototype shipping dock installation having approximately twenty-five delivery bins, a door-opening rail approximately 1200 feet long (consisting of 15 foot and 18 foot hingedly connected sections) has been successfully utilized in combination with seventy-seven jacks positioned at the hinge joints. A door-closing rail (consisting of fifteen and eighteen foot sections) approximately 360 feet long was utilized having twenty-four jacks at the hinge joints. Normal operation requires that about ten switches of the switch group 83 be in the "Up" or closed position as illustrated in FIG. 14. Train speed over the dock is normally 5 m.p.h. and at this speed the open doors will discharge the pellets in approximately 20 seconds which is equal to 146 feet (i.e. within the length of any three adjacent bins). Slower train movement would shorten the distance over which the pellets are distributed and faster movement would lengthen the spread. A vertical movement of approximately three inches at a hinge joint by the associated jack 30 has been found to be satisfactory.

In normal procedure for dumping, twelve ramp sections at the entering end of the dock are raised until the desired bin level is obtained, wherein the switch controller at the remote control panel is displaced one notch at a time to drop number one ramp section and to pick up number thirteen. Movement of the next notch will drop out number two and pick up number fourteen and so forth, or if it is desired to skip any portion of the dock, the switch controller is merely quickly moved over and past the switches controlling the ramp on that portion. Should it be desired to dump the entire train into three consecutive bins, the controller is merely placed in the corresponding position and is left there.

Timewise, an entire train of ninety-six loaded ore cars travelling at the rate of 5 m.p.h. may be dumped into any three adjacent bins in 8 minutes and 28 seconds or dumped the entire length of the dock in 11 minutes and 11 seconds. The addition of the resilient wheels to the ore cars increased the overall width of the cars by only 11 inches, thus causing no clearance problems as presented by prior known types of devices.

The cooperation of the resilient tires with the door operating rails has proven to be satisfactory for various adverse weather conditions (rain, ice, sleet, etc.). The ends of each sectional rail are rounded for initial contact with the pneumatic wheels. It is to be noted that as the pellets run from the opening doors the ore car becomes lighter and raises on the springs, thus causing the tire to lift clear of the ramp to stop the transfer of motion; the effect is that of an automatic clutch. Due to the varying weights of the ore cars, the advantageous use of the slightly compressible resilient tires over non-compressible wheels is obvious.

The automatic car dumping system of the instant invention—due to its simplicity and rapid unloading of the ore car train—will result in considerable savings not only in labor costs for workmen at the docks but also in the wages of the train operators since the train can be automatically unloaded selectively in an efficient manner without stopping or reversing the direction of train movement.

Although it is preferred that the door-operating rail sections be hingedly connected to each other as described above, it is possible that the illustrated invention could be modified for operation with the pivotal connection between the ends of the sections being omitted.

It is to be understood that the ore car is or may be operated in either longitudinal direction. In other words, it is immaterial which end of the car is serving as the lead end. Either of the rotatable door operating wheels may engage the door opening rail depending on which end of the car is serving at the time as the lead end, and similarly either of the rotatable wheels may engage the door closing rail depending on which end of the car is serving at the time as the lead end.

While in accordance with the patent statutes I have illustrated and described the best forms and embodiments of the invention now known to me, it will be apparent to those skilled in the art that other changes may be made in the system and apparatus described without deviating from my invention as set forth in the following claims.

I claim:

1. In combination with a railway dump car mounted for travel on bed rails above a delivery area and having a car body with a door in the bottom thereof operable by gearing means, the invention which comprises means for driving said gearing means including a shaft rotatably connected to said body and extending outwardly therefrom, said shaft being operatively connected to said gearing means to drive the same in a given direction, a resilient wheel rigidly secured to said shaft externally of said body, an actuating rail mounted parallel to said bed rails adjacent said delivery area, and means for moving said actuating rail vertically relative to said bed rails to a position for frictional engagement with said resilient wheel to rotate said shaft and drive said door operating gearing means, said actuating rail consisting of a plurality of colinearly-arranged rail sections pivotally connected together at their adjacent ends.

2. Apparatus as defined in claim 1 wherein said means for moving said actuating rail vertically relative to said bed rails includes jack elements positioned at each hinge connection between adjacent rail sections, said rail sections being supported solely by said jacks.

3. Apparatus as defined in claim 2 wherein each of said jack elements comprises a stationary outer sleeve and an inner sleeve vertically movable relative to said outer sleeve, said inner sleeve having at least one hinge plate at the upper extremity thereof, and further including means pivotally connecting adjacent ends of two of said rail sections to said hinge plate.

4. Apparatus as defined in claim 2 wherein each of said jack elements is of the fluid operated type and includes an electrically-actuated control valve, and further including electric circuit means connecting each of the jack control valves independently to a remote control panel.

5. Apparatus as defined in claim 4 wherein said electric circuit means includes separate series circuits for each of said control valves, each of said series circuits including a switch secured to said remote control panel.

6. Apparatus as defined in claim 5 wherein said switches are arranged in a row on said control panel, and further including means for operating a plurality of said switches successively.

7. Apparatus as defined in claim 6 wherein said means for operating said switches successively comprises a guide rail secured to said control panel parallel to said row of switches, and switch actuating means slidably movable along said guide rail for operating said switches.

8. Apparatus as defined in claim 7 wherein said switch actuating means includes a first block connected to said guide rail and having a cam groove in one surface thereof adapted to slidably receive the switch actuating elements.

9. Apparatus as defined in claim 8 wherein the cam groove in said first block is of a configuration to move the switch actuating elements to close the associated switch circuits as the block moves in one direction along the guide rail, and further including a second block slidably connected to said guide rail, and means connecting said first and second blocks in longitudinally spaced relation, said second block having a cam groove therein of a configuration to move the switch actuating elements to open the associated switch circuits as said second block is moved along the guide rail with said first block.

10. Apparatus as defined in claim 9 wherein said means connecting said first and second blocks is longitudinally adjustable to vary the spacing between said blocks.

11. In combination, a railway dump car mounted for travel on bed rails above a delivery area and having a car body with a pair of doors at the bottom thereof, means for actuating said doors between an open and a closed position, said door actuating means comprising a rotatable actuating rod individual to each said door, each said door being closed when its actuating rod is rotated in one direction and opened when rotated in the opposite direction, a pair of rotatable shafts extending outwardly from said car in opposite directions, a rotatable driving member secured upon each of said shafts, a pair of movable actuating rails mounted parallel to said bed rails adjacent said delivery area beneath said driving members and on either side of said bed rails, means for selectively moving each said actuating rail to a position engaging its corresponding rotatable driving member, each said driving member being rotated in the same direction when engaged with its corresponding actuating rail, and rotary transmission means coupling each said rotatable driving member and its rotatable shaft with both of said actuating rods for opening or closing said doors respectively, said transmission means including a reversing gearing member by which said rotatable shafts are rotated in opposite directions.

References Cited in the file of this patent
UNITED STATES PATENTS

| | | |
|---|---|---|
| 716,423 | Hunt | Dec. 23, 1902 |
| 1,092,659 | Mettler | Apr. 7, 1914 |
| 1,434,682 | Cormack | Nov. 7, 1922 |
| 1,718,165 | Mahan | June 18, 1929 |
| 1,797,931 | Storer | Mar. 24, 1931 |
| 2,686,605 | Kepner | Aug. 17, 1954 |
| 2,690,851 | Johnson | Oct. 5, 1954 |
| 2,909,294 | Newell | Oct. 20, 1959 |